Aug. 13, 1935.　　J. C. WICHMANN　　2,011,331
PROCESSING SPOOL
Filed Aug. 4, 1930　　4 Sheets-Sheet 1
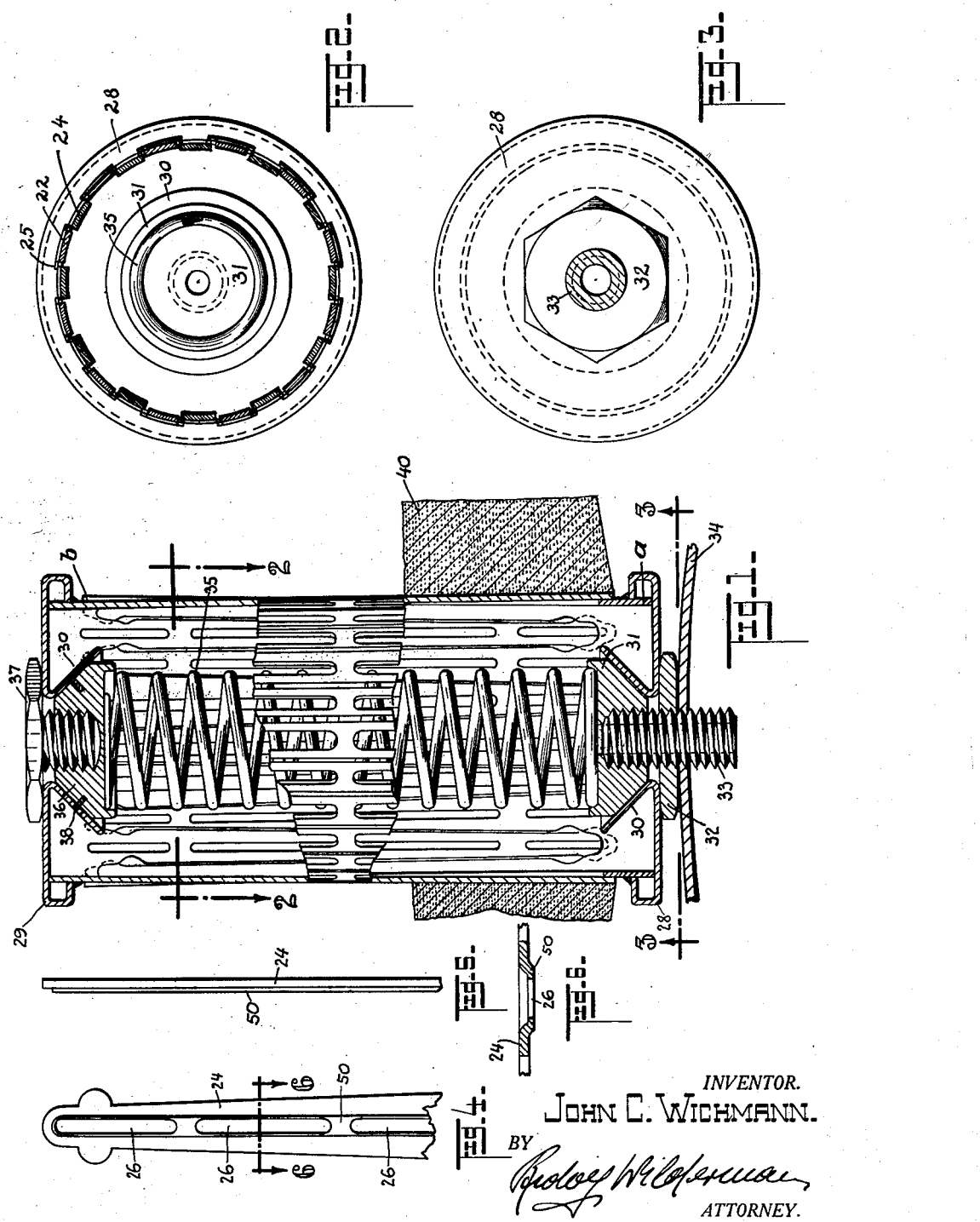
INVENTOR.
JOHN C. WICHMANN.
BY
ATTORNEY.

Aug. 13, 1935.  J. C. WICHMANN  2,011,331
PROCESSING SPOOL
Filed Aug. 4, 1930  4 Sheets-Sheet 2
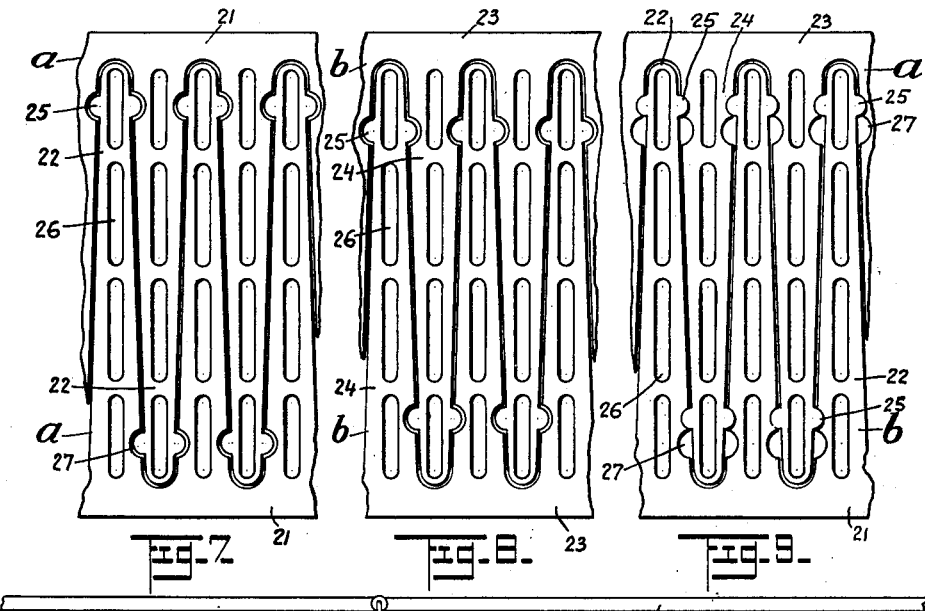
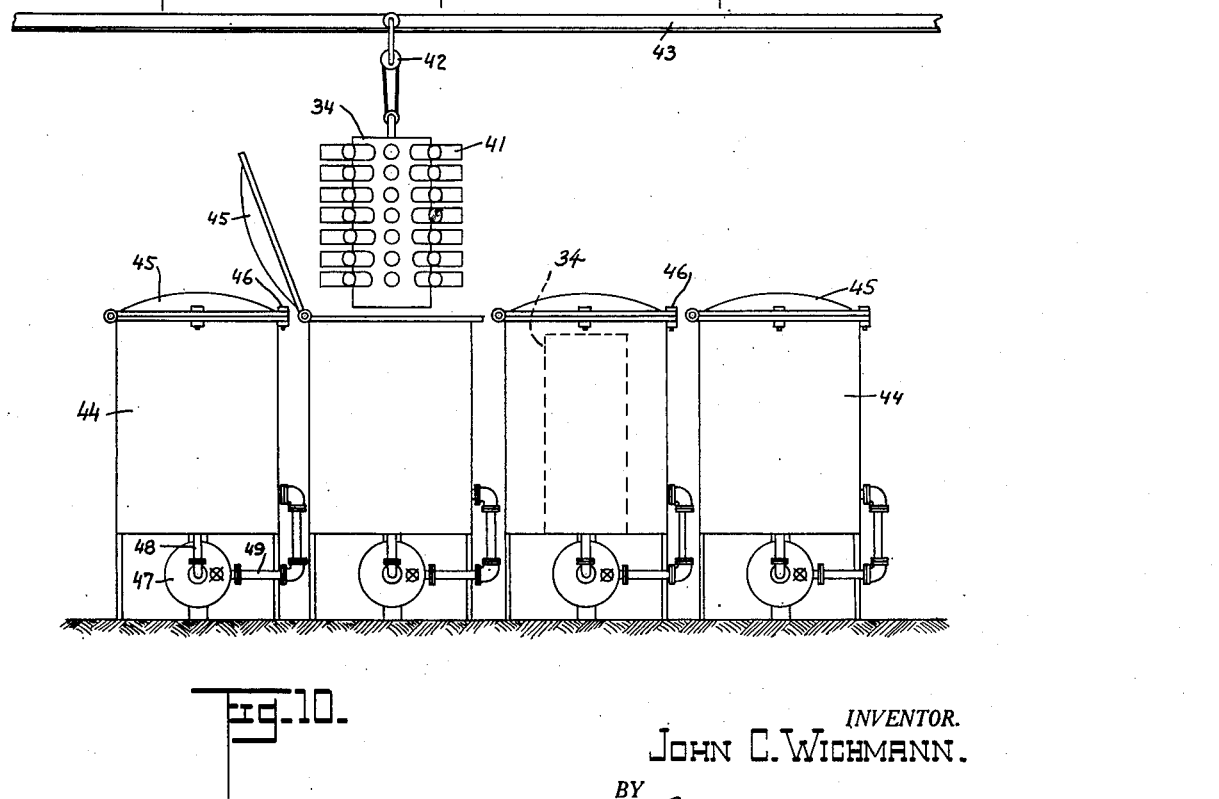
INVENTOR.
JOHN C. WICHMANN.
BY
ATTORNEY.

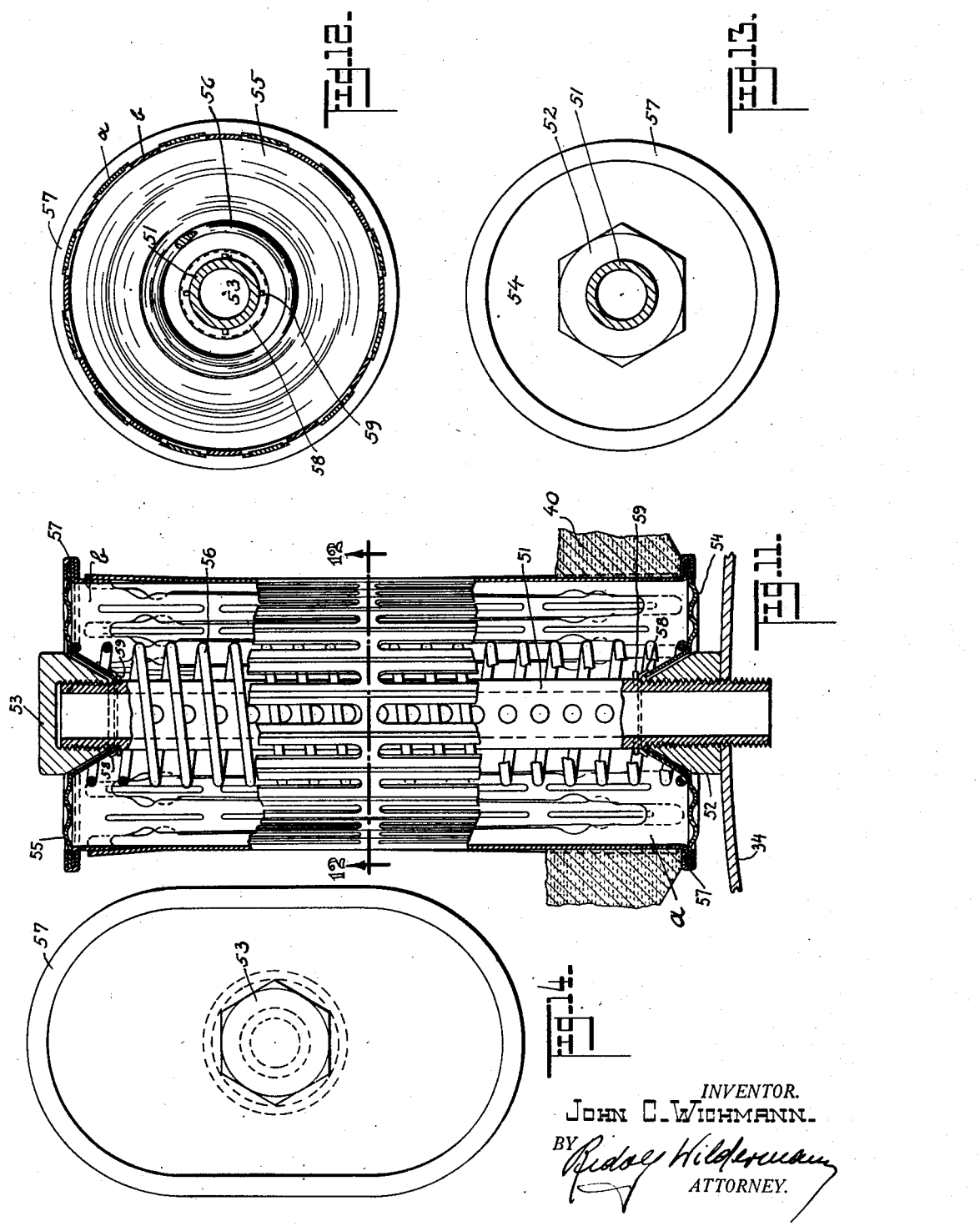

Aug. 13, 1935.  J. C. WICHMANN  2,011,331
PROCESSING SPOOL
Filed Aug. 4, 1930  4 Sheets-Sheet 4
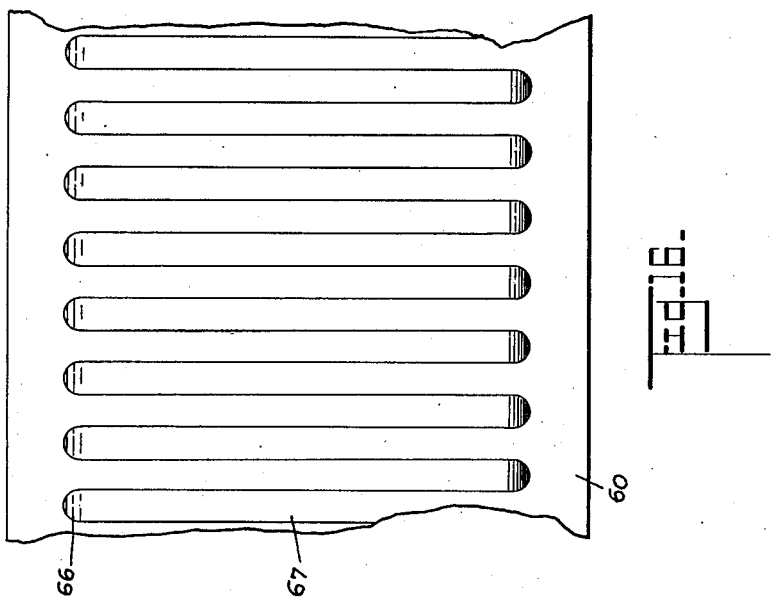
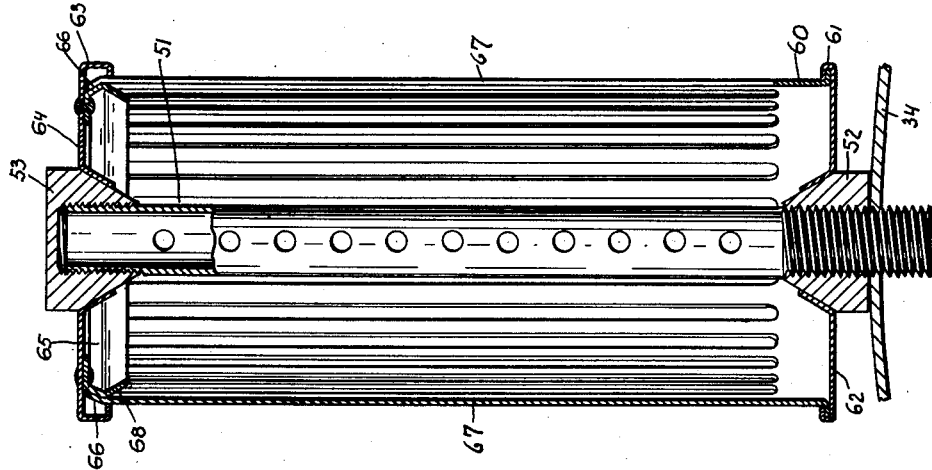
John C. Wichmann.
*INVENTOR.*
BY
*ATTORNEY*

Patented Aug. 13, 1935

2,011,331

UNITED STATES PATENT OFFICE 2,011,331

PROCESSING SPOOL

John C. Wichmann, New York, N. Y.

Application August 4, 1930, Serial No. 472,771

16 Claims. (Cl. 242—118)

My invention concerns a novel spool which is particularly adapted for textiles during the process of manufacture; for instance, for mercerizing cotton or for degumming, bleaching, dyeing and drying cotton, silk and rayon.

One of the objects of my invention is to provide a spool upon which textiles may be mercerized.

Another object of my invention is to provide a spool for textiles, upon which a multiplicity of operations, such as mercerizing, bleaching, degumming, dyeing or drying may be performed on the ends contained thereon, without removing said ends from said spool.

Another object of my invention is to provide a spool upon which goods contained thereon may be thoroughly steeped or mercerated by suitable fluids.

A further object of my invention is to provide, in a spool, elastic properties in an axial and radial direction to allow for the free expansion or contraction of the material which is contained on said spool.

These and other objects which underlie my invention will be more clearly understood from the following description and from the illustrations in the accompanying drawings, in which, Fig. 1 shows a cross-sectioned side view of a spool of my invention attached to a partly shown fluid container.

Fig. 2 shows the sectioned end view of the same spool taken on the line 2—2 in Fig. 1.

Fig. 3 shows the same spool in an opposite end view taken on the line 3—3 in Fig. 1.

Fig. 4 shows the top view of a modified tongue which I use in connection with my invention.

Fig. 5 shows a corresponding side view.

Fig. 6 shows a cross-section of the tongue taken on the line 6—6 in Fig. 4.

Figs. 7 and 8 show the blanks which I use in the manufacture of my spools.

Fig. 9 shows, in a developed view, the manner in which the cylindrical surface of my spools is assembled when they are in use.

Fig. 10 schematically illustrates the treatment apparatus in connection with which my spools are to be used.

Fig. 11 shows a partially sectioned view of a modified spool of my invention on an arbor used in connection with and attached to a fluid container.

Fig. 12 shows a corresponding cross-sectioned end view taken on the line 12—12 in Fig. 11.

Fig. 13 shows an end view of the same spool.

Fig. 14 shows an end view of a modified form of my spool.

Fig. 15 illustrates, in a cross-sectioned view, another modification of my invention.

Fig. 16 shows, in a developed view, the blank which is used in making the spool shown in Fig. 15.

Similar numerals refer to similar parts throughout the several views.

I preferably use in the manufacture of my spools resilient sheet material in the form of tubes or of sheets. That material serves for the drum part of my spool. If a seamless tube is used, its cylindrical surface is cut by dies into shapes which make the tubes radially elastic along that part of the cylindrical circumference which is to be used for spooling material thereonto. But the desired shape may also be given to the material used for the drum part of my spools when that material is in sheet form; and the shapes stamped out of said sheet material are bent into substantially cylindrical form and into the shape of the enclosure on which I desire to spool materials. The free ends of the sheet material are joined together by welding, brazing, soldering or another seaming process. The blanks which I use in making one modification of my spools are shown in Figs. 7 and 8. The lines, along which the blanks a and b are cut, are shown in double lines with a narrow clearance space therebetween, whereas the perforations in the blanks, which in this instance have the shape of slots,—but which also may be circular openings or may assume any other geometrical outline,—are indicated in single lines.

From the solid sides 21 of the blanks a extend the tongues or resilient members 22; similarly the tongues 24 extend from the solid ends 23 of blank b. Near their free ends, the tongues 22 and 24 of the blanks a are provided with laterally extending lips 25, and the tongues are longitudinally provided with perforations 26. The lips 25 register with corresponding clearance openings 27 near the base of the adjoining tongues. The lips may be shaped to curve in—or outwardly.

In Fig. 9, the blanks a and b are assembled to form the drum surface for my spool. The lips 25 of the tongues 22 rest on top of the tongues 24, whereas the lips of the tongues 24 rest upon the tongues 22. The view of Fig. 9 is a developed view of the drum face of my spool, no matter whether the blanks a and b are circularly bent from sheet materials to form that drum, or whether they are made out of seamless tubing.

It is observed that, when the sheets *a* and *b* are withdrawn from each other in the direction of the tongues, the lips 25 are adapted to drop downwardly through the clearance 27 in the tongues 24 so that parts *a* and *b* may readily be disengaged from each other. The view of Fig. 1 shows the drum surface assembled in the manner of Fig. 9. The solid ends of the parts *a* and *b* are soldered into suitably beaded flanges 28 and 29 respectively. The flanges are spun or formed into the shape shown. The skirt 30 inwardly extends from said flanges.

By means of the conical collar 31 and the nut 32, the flange 28 is clamped onto the threaded bushing 33 through which suitable fluids may be adduced to the interior of the spool from a fluid container 34 into which said bushing threadedly extends.

A helical spring 35 is soldered or otherwise suitably fastened onto the conical collar 31 and carries upon its other end a conical plug 36 which fits into the skirt 30 of the flange 29. The flange 29 is clamped onto the conical plug 36 by means of the screw 37 and pins 38 may be provided for upon the plug 36 and may extend into suitable holes 39 in the skirt 30 of the flange 29, in order to prevent rotation of the plug 36 in the skirt 30.

The two parts *a* and *b* of the drum face extend over each other to a slightly greater extent in the assembled spool of Fig. 1, than shown in Fig. 9, so that the free ends of the tongues extend from the solid ends 21 and 23 slightly over the ends 23 and 21 respectively. Onto the spool is wound the thread 40 and in being wound onto the spool, that material substantially closes the circumference of the drum part of the spool, so that the spool represents an enclosure. Fluids may be pressed into or sucked from the spool through the bushing 33 and are forced through the material wound onto the spool, into or from a container, into which the spool is lowered and which is adapted to receive the same fluid.

In order to more clearly define the improvements incorporated in my invention, I show in Fig. 10 an apparatus, by means of which the material on my spools may readily be subjected to a multiplicity of treatments with different fluids contained in various vats. The system shown in Fig. 10 is commonly known as the Obermaier system for dyeing and bleaching yarns on spools. A multiplicity of these spools 41, of my invention, are arranged upon the surface of a container 34 which is closed at the top, and there provided with means by which the container may readily be carried by means of a conveyor 42 along a rail 43 from one place of use to another. The container 34 is adapted to be lowered by means of the conveyor 42 into a vat 44. The vat 44 is provided with a cover 45 which may be clamped onto the open top of the vat by means of bolts 46. A pump 47 is arranged below the vat and its inlet and outlet ends are connected to the bottom center of the vat and to the side of the vat by means of pipe lines 48 and 49. When the container 34 is lowered into one of the vats 44, the open bottom end of the container comes to rest upon the bottom of the vat, above the opening, through which the pipe 48 issues upon the vat. The lower edge of the retainer is suitably shaped to seal against the bottom of the vat and means may be provided between the top of the container 34 and the cover 45 of the vats to press the containers sealedly down onto the bottom of the vat. The pumps 47 are adapted to be rotated in both directions, so that the liquid fluid may be passed therefrom through the pipe 48 into the container, from there through the bushing 33 into the spools fastened upon the container, through the material wound onto the spools, and finally the fluid is returned from the vat through the pipe line 49 to the pump. When the direction of the operation of the pump is reversed, the fluid passes from the pump through the pipe line 49 into the vat and is pressed through the material on the spool into the interior of the spool and from there back through the container 34 and the pipe 48 to the pump. The material mounted on the spools, may be subjected to a thorough treatment with any liquid or gaseous fluid by means of reversal of the pump at predetermined time intervals, and the elasticity of the drum part of the spool allows shrinking and expanding of the material mounted on the spool without subjecting the yarns of the material to undue strain and without allowing that material to become loose upon the spool. By means of incorporating such a massaging or breathing operation in the treatment of the materials on the spools, a much more thorough penetration of the fluid into the fibers of the material is secured and the treatments may be performed in a considerably shorter time. The mercerizing of cotton is particularly made possible on spools of my invention, whereas heretofore that operation had to be performed in skeins.

Material mounted on the spools may be carried through all of the necessary treatments, while said material is mounted upon my spool. The spool is capable of expanding and contracting longitudinally as well as radially, while the material to be treated is wound thereon. When the material upon my spools 41 has been dried, or even while it is still wet, it may readily be removed from the spools. Such removal is brought about by the simple operation of removing the screw 37 from the plug 36. After that has been done, the flange 29 together with the drum part *b*, forming part thereof, may be pulled out of the spool, the lips 25 upon the tongues 22 slipping through the clearances 27 in the tongues 24 of the drum part *a* into the inside of the drum, whereupon those parts are free to be removed. The material then remains suspended upon the tongues 22 of the drum part *b* and may be pulled right off those tongues, the tensile properties of said tongues facilitating the withdrawal of the material. In order to slightly lift the material wound onto the spools from the surface of said spools, and in order also to reenforce the tongues, the mode of construction shown in Figs. 4, 5, and 6 may be resorted to. A rib 50 may be provided centrally in the tongue for that purpose, the rib being produced by raising the material of the tongue at that point, and the openings 26 are provided in the flat top of the ribs 50. Sharp edges or burrs outwardly protruding from the tongues are removed therefrom during the manufacture of the drum.

In the arrangement of Fig. 1, I show my spools mounted upon a helical spring arbor 35. The outer part of the spool with the flange 29 may be removed from the spool by loosening the screw 37. The rest of the spool may be removed from the bushing 33, which extends from the fluid container 34, by removing the conical collar 31 from the bushing 33, whereupon the back flange 28 may be removed from the container.

In the arrangement of Fig. 11, I show my spool mounted upon a solid arbor which has the shape of a perforated tubing 51, which is threadedly engaged upon the container 34 at one end, and fixedly retained on said container by the nut 52, whereas the open end of the tubing 51 is closed by a hexagonal cap 53. The spool is retained upon the arbor between the conical ends of the nut 52 and the cap 53. The flanges 54 and 55 are provided with tapered inlets which fit over the conical ends of the nut 52 and the cap 53 respectively. The spring 56 extends between the two flanges 54 and 55 and presses said flanges onto the nut 52 and the cap 53. The parts a and b of the drum are flared out at their solid ends and are assembled upon the flanges 54 and 55 by means of the beaded annular members 57 which are beaded thereover. When the material mounted upon the spool is to be subjected to reverse operations, for massaging or breathing treatments as referred to above, the movement of the flanges 54 and 55 towards each other may be restrained by conical washers 58 retained upon the tubing 51 by pins 59, said conical washers fitting below the tapered faces of said washers and preventing the flanges from being drawn towards each other under suction. The use of these washers and pins 58 and 59 may however be avoided by use of strong compression springs 56. In order to allow the drum part of the spool to expand and contract longitudinally without affecting the seal of the flanges against the nut 52 and the cap 53, I provide concentrically disposed corrugations upon the flanges 54 and 55, which, in Bourdon gage fashion, convey elasticity upon the flanges.

For certain treatments, the use of particularly shaped drum parts in the spool is advisable. Such shapes may readily be given to my spool by arranging the tongues or resilient members accordingly. Fig. 14 thus shows a spool of oblong shape.

The view of Fig. 15 shows a modification of my spool in which the tongues or resilient members extend from one end, only, of the spool. This view again shows a suction tubing 51 which is mounted upon the fluid container 34 by means of the conical nut 52 and upon which the spool is retained by the conical cap 53. The solid end 60 of the drum part is flared out and retained below the beaded edge 61 of the flange 62. A wider cap 63 is provided upon the flange 64 at the other end of the drum. Onto the inside of the flange 64 is riveted an annular member 65, the rim of which has the shape of a double cone, the curved ends 66 of the resilient members 67 being retained upon the annular member 65 by one of said conical faces of the rim.

The cap 63 may be pulled off the spool, after the screw cap 53 has been removed from the tubing 51; and then the resilient members 67 freely support the material wound onto the spool in the manner of the spools shown in Figs. 1 and 11. The spool of Fig. 15 may also be provided with a compression spring which loosely extends around the tubing 51 and which presses the flanges 62 and 64 onto the conical face of the nut 52 and the cap 53. The flanges may be, in this modification of my spool, as well as the flanges of the spool in Fig. 1, provided with corrugations in the manner of the flanges of Fig. 11.

The drum part of the spool of Fig. 15 may be made from sheet material which is cut in the manner shown in the developed view of Fig. 16. By cutting the sheet material in this fashion, interlocking parts are produced which may be used for two spools. It is, however, not necessary to space apart the tongues of each spool at a distance which is equal to the width of said tongues; but said tongues extending from a solid end 60 may be made so wide as to leave only a narrow space therebetween.

The outer cone face 68 of the rim of the annular member 65 serves to guide the inwardly curved ends of the resilient members 67 below the bead 63 of the flange 64, when said flange is assembled onto the drum. The curved ends 66 snap over the inner cone face of the rim of the annular member 65 after they have been thus introduced below the bead 63 and the spool then represents a substantially solid assembly.

While I have shown and described my invention with some degree of particularity, I realize that various changes, alterations and modifications may be resorted to. I therefore do not wish to be limited to the exact construction shown, but reserve the right to make such alterations and modifications as may well fall within the scope of the subject matter now being claimed.

What I claim is:

1. A spool comprising a pair of flange means at its ends, substantially parallel resilient members surrounding the space between said flange means and alternately mounted upon the one and the other of said flange means, and lips on said members resting upon adjoining members.

2. A spool comprising a pair of flange means at its ends, substantially parallel resilient members, surrounding the space between said flange means and alternately mounted upon the one and the other of said flange means, and lips on said members resting upon adjoining members and adapted to drop through clearance openings in said adjoining members, when said flange means are pulled apart.

3. In a yarn winding and processing spool, a drum portion including a bi-part separable drum surface, with said surface consisting entirely of a plurality of longitudinally disposed spaced resilient members, alternately free at one end and secured at the other end to provide a resilient yarn winding surface, and means for slidably supporting alternate members at the same end of the drum to provide a slidable support for the free end of each member whereby one half of the members are slidably supported at one end of the drum and the other half at the other end.

4. In a yarn winding and processing spool, a bi-part drum portion with each part having an annular rim at one end and including a plurality of longitudinally disposed spaced resilient members alternately free at one end and connected with said annular rim at the other end, to provide a resilient yarn winding surface, and means for slidably supporting alternate members on the rim at the same end of the drum to provide a slidable support for the free end of each member, whereby one-half of the members are supported on the rim at one end of the drum, and the other half on the rim at the other end.

5. In a yarn winding and processing spool, a drum portion having a bi-part separable resilient yarn winding surface consisting entirely of a plurality of interposed longitudinally disposed spaced resilient members alternately free at one end and secured at the other end, and means for slidably supporting the free ends of alternate members at opposite ends of the drum, with said members spacedly perforated over the surface thereof whereby a resilient perforated surface is provided permitting processing of the yarn wound thereon.

6. In a yarn winding and processing spool, a drum portion including a pair of separable members, each member having a closure member at one end, a plurality of longitudinally disposed resilient fingers fixedly connected to a closure member at one end and free at the other end, adapted to be positioned in slidable fitted relationship and oppositely extending to provide a resilient yarn winding surface, with said closure members concentrically corrugated in Bourdon gage fashion whereby said slidable fingers and said corrugated closure members cooperate to permit longitudinal expansion and contraction of the drums.

7. In a yarn winding and processing spool, a drum portion having a resilient yarn winding surface including a plurality of interposed longitudinally extending resilient fingers with said fingers having alternately a free end and a fixedly secured end at the same end of the drum in longitudinal slidable relationship around the entire surface thereof, a closure member at each end of the drum connected with the secured ends of the fingers, and a helical spring member interposed between said closure members within the drum cooperating with said slidable fingers to permit longitudinal expansion and contraction of the drum.

8. A yarn winding and processing spool including a pair of separable members, with each member comprising an annular rim at one end, a plurality of resilient longitudinally extending fingers secured to said rim at one end and free at the other end, with said fingers in the members adapted to be fitted between each other in oppositely extending directions with the free ends slidably supported on the corresponding rim, and flexible connecting means for said separable members within the spool, whereby both radial and longitudinal expansion of the surface of the spool is permitted.

9. A yarn winding and processing spool, including a closure member at each end, an annular rim flange extending inwardly from each of said closure members, substantially parallel resilient fingers entirely surrounding the space between said rims, and alternately mounted upon the one and upon the other of said rims, and flexible means within the spool cooperating to maintain the rims in spaced relationship.

10. In a yarn winding and processing spool, a closure member at each end, an annular rim flange extending inwardly from each of said closure members, substantially parallel resilient fingers fixedly secured at one end and free at the other end lying adjacent one another and entirely surrounding the space between said rims, with alternate fingers extending toward opposite rims and the free ends of the fingers supported upon the rim toward which they extend to provide a complete resilient surface on said spool.

11. In a yarn winding and processing spool, a bi-part separable drum having end closure members, a plurality of individual resilient fingers extending longitudinally between said members to provide a resilient yarn winding surface, with said fingers free at one end and secured at the other, and means for retaining said separable parts of the drum in fixed relationship but permitting complete separation of the same whereby to collapse said fingers at the free ends for ready removal of the yarn from the drum.

12. In a yarn winding and processing spool, a drum portion including a pair of end closure members, a plurality of resilient fingers extending longitudinally from one of said closure members, fixedly connected with the closure member at that end and free at the other end, and means on the other closure member for receiving the free ends of the fingers to removably retain the same in locking engagement whereby to provide a bi-part resilient surface yarn winding drum permitting ready removal of the yarn therefrom.

13. In a yarn winding and processing spool, a drum portion including a pair of end closure members, a plurality of resilient fingers extending longitudinally from one of said closure members, fixedly connected with the closure member at that end and free at the other end, and retaining means on the other closure member for the free ends of said fingers, said means comprising an inwardly extending flange on the outer edge of the closure member, and a flange extending downwardly therefrom, and an annular member secured to said closure member having a cone shaped edge adjacent said downwardly extending flange adapted to receive the free ends of the fingers therebetween, to removably retain the same.

14. In a yarn winding and processing spool, a drum having a continuous rim at each end, a plurality of individual resilient fingers extending longitudinally between said members to provide a resilient yarn winding surface, with said drum comprising two separable members each including alternate resilient fingers, means permitting separation of the two members, and means on the fingers permitting ready removal of the yarn on the separated member, said means including a rib raised centrally and lengthwise of each finger providing a smooth sliding surface for the yarn.

15. In a yarn winding and processing spool, an expansible drum comprising a pair of separable members, an annular closure member at the outside end of each of the separable members, a plurality of individual resilient fingers extending inwardly from each closure member, fixedly connected at that end and free at the other end, adapted to lie in interposed fitted relationship to provide a continuous resilient yarn winding surface, and means for removably retaining said separable members in fitted relationship.

16. A yarn winding and processing spool including a bi-part drum-shaped winding surface consisting entirely of a plurality of fingers free at one end and immovable at the other end, and normally retained in alternately oppositely disposed fitted relationship over said surface, with said two parts adapted for separation whereby to collapse the fingers at the free ends for removal of yarn from the spool.

JOHN C. WICHMANN.